(12) United States Patent
Ceylan

(10) Patent No.: US 11,497,673 B2
(45) Date of Patent: Nov. 15, 2022

(54) MOTION-LIBERATING SMART WALKING STICK

(71) Applicant: WEWALK TEKNOLOJI INC., Istanbul (TR)

(72) Inventor: Kürşat Ceylan, Istanbul (TR)

(73) Assignee: WEWALK LIMITED, London (GB)

( * ) Notice: Subject to any disclaimer, the term of this patent is extended or adjusted under 35 U.S.C. 154(b) by 697 days.

(21) Appl. No.: 16/347,535

(22) PCT Filed: Oct. 9, 2017

(86) PCT No.: PCT/TR2017/000106
§ 371 (c)(1),
(2) Date: May 3, 2019

(87) PCT Pub. No.: WO2018/084816
PCT Pub. Date: May 11, 2018

(65) Prior Publication Data
US 2019/0307633 A1    Oct. 10, 2019

(30) Foreign Application Priority Data

Nov. 3, 2016  (TR) ................................ 2016/15742

(51) Int. Cl.
*A61H 3/00*      (2006.01)
*A61H 3/06*      (2006.01)
(Continued)

(52) U.S. Cl.
CPC .............. *A61H 3/061* (2013.01); *A61H 3/068* (2013.01); *G08B 5/00* (2013.01);
(Continued)

(58) Field of Classification Search
CPC ....................................................... A61H 3/061
See application file for complete search history.

(56) References Cited

U.S. PATENT DOCUMENTS 3,546,467 A * 12/1970 Benham ................. A61H 3/068
250/215
7,267,281 B2 * 9/2007 Hopkins ................. A61H 3/061
135/911
(Continued)

FOREIGN PATENT DOCUMENTS

| CN | 101120835 A | 2/2008 |
| CN | 203777268 U | 8/2014 |
| CN | 104644401 A | 5/2015 |

*Primary Examiner* — Noah Chandler Hawk
(74) *Attorney, Agent, or Firm* — Muncy, Geissler, Olds & Lowe, P.C.

(57) ABSTRACT

A smart walking stick made up of main parcels including the upper body forming the upper body and the lower body elements forming the lower body. With the aim of positioning the hand correctly for the visually impaired user, sensors are provided, which contain technological elements such as soft-grip upper gripping surface and the lower gripping surface, touch mouse, vibration motors and a smart module that allows the user freedom of movement. A folding bar forms the stick portion of the movement-releasing smart walking stick which can be replaced by a snap-fit method, with the motion-liberating smart walking stick this allows the visually impaired user to easily, safely and comfortably navigate with location information, which increases the freedom of movement, to detect and protect the obstacles in front of the movement, and to maintain a more ergonomic life.

22 Claims, 5 Drawing Sheets

Figure 1:
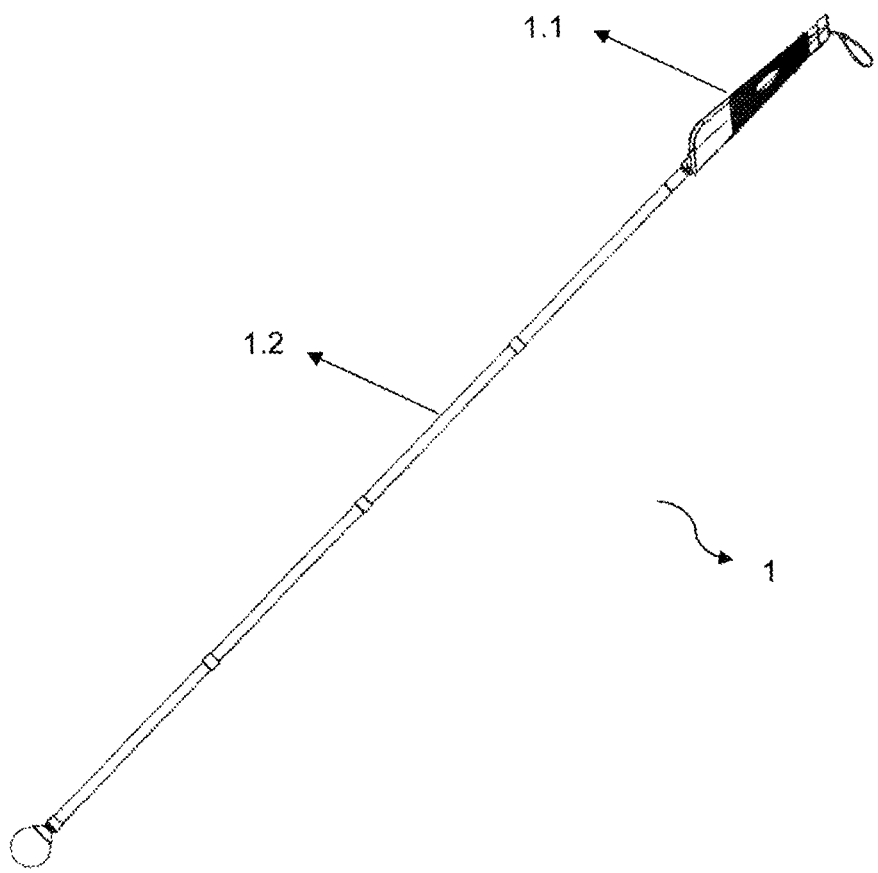

(51) Int. Cl.
   *G08B 5/00* (2006.01)
   *H04M 1/724* (2021.01)
(52) U.S. Cl.
   CPC .......... *A61H 2003/063* (2013.01); *A61H 2201/0161* (2013.01); *A61H 2201/5058* (2013.01); *H04M 1/724* (2021.01)

(56) References Cited

U.S. PATENT DOCUMENTS

| | | | | |
|---|---|---|---|---|
| 7,706,212 B1 * | 4/2010 | Campbell | .............. | A61H 3/061 367/116 |
| 7,778,112 B2 * | 8/2010 | Behm | .............. | G01S 15/93 367/116 |
| 8,077,020 B2 * | 12/2011 | Behm | .............. | A61H 3/068 340/407.1 |
| 8,627,839 B1 * | 1/2014 | Martinez | .............. | A45B 3/00 135/66 |
| 8,922,759 B2 * | 12/2014 | Gassert | .............. | A61H 3/061 356/5.01 |
| 9,646,514 B2 * | 5/2017 | Rizzo | .............. | A61H 3/04 |
| 9,826,806 B2 * | 11/2017 | Challa | .............. | A45B 3/02 |
| 10,537,490 B2 * | 1/2020 | Rizzo | .............. | A61H 3/04 |
| 10,551,940 B2 * | 2/2020 | Cutrell | .............. | G06F 3/0346 |
| 11,116,689 B2 * | 9/2021 | Petersen | .............. | A45B 9/00 |
| 2006/0028544 A1 * | 2/2006 | Tseng | .............. | A61H 3/061 348/62 |
| 2008/0251110 A1 * | 10/2008 | Pede | .............. | A61H 3/061 135/66 |
| 2009/0028003 A1 * | 1/2009 | Behm | .............. | G01S 17/88 367/116 |
| 2009/0032590 A1 * | 2/2009 | Hopkins | .............. | A61H 3/061 235/385 |
| 2011/0037560 A1 * | 2/2011 | Belloteau | .............. | A61H 3/061 340/4.1 |
| 2013/0113601 A1 * | 5/2013 | San Luis | .............. | G01S 15/93 340/4.1 |
| 2018/0356233 A1 * | 12/2018 | Baqain | .............. | A61H 3/068 |

\* cited by examiner

MOTION-LIBERATING SMART WALKING STICK

TECHNICAL FIELD

The invention is about smart walking sticks that provide visually impaired freedom of movement for the visually impaired, with the purpose of guiding them in their daily lives.

The invention relies on a motion-liberating smart walking stick which has emerged with the thought that the white walking stick, which has been used for many years by visually handicapped people, has to be developed only from a simple stick, and aiming at eliminating more obstacles and providing more freedom of movement by providing the location information to visually impaired and aiming to facilitate the lives of the visually impaired with various technological innovations.

THE OLD TECHNIQUE

With the recent development of technology, it is called white walking stick that the "sensor" which informs the visually impaired to the obstacles in the front by the vibration, or walking sticks with improvements such as adding a "spinning ball" to facilitate movement, and the white walking stick has been functioning in the same fiat and simple style for many years.

However, today's equivalent products have technical deficiencies. It is known that the developments abovementioned do not provide the freedom of movement as much as the capacity. Due to the obstacle recognition sensor sensitivity, in the usage of white walking stick all the obstacles which may faced are informed to visually impaired via vibration. This, in the case of the visually impaired user, causes the sensor to be susceptible to vibration resulting from the sensor and the user is beginning to ignore the vibrations that come in time during use.

White walking sticks are not manufactured in an upgradeable construction. Blind people who want to have new, improved models can not benefit from the old models they have, and has to keep it out of use. This result is a material loss.

Because of the weight of the developed white walking sticks, it causes fatigue in the visually impaired user even in a short usage period.

As a result of these problems, white walking stick, sufficient movement freedom of the visually impaired user, including today's sensor models developed can not provide single-handed the places they want easily, comfortably and safely.

The studies conducted in literature, with invention that faced with TR 2014 05331 application, A61 H 3/00 IPC class, "Visually Impaired, smart voice information and guidance system 1 which can interact with pelvic using Bluetooth, gps, GPRS technologies", is a visually impaired walking stick; white stick, that the information that an electronic card integrated in it gets from special Bluetooth signal modules already placed on the objects, and when needed by means of sharing the geographical location information received via GPS with visually impaired individuals, related to the disabled handkerchief to increase the awareness of the visually impaired with their surroundings.

Another invention encountered in the literature is the TR 2012 01779 application number, A61 H 3/00 IPC class "Ultrasonic white walking stick for visual impairment". The present invention relates to at least one electronic system for detecting visually impaired individuals located on at least one walking stick pillow to assist in performing road and directional recognition and for determining distances to obstacles such as obstacles, hollow or unevenness on the direction of an individual. The mentioned walking stick contains at least one ultrasonic detection section located on the end portion of the ultrasonic waves transmitted and detecting the return of the object on the ground surface, the surface of the ground or the surface of the ground, or the ground surface. Said ultrasonic sensor section comprises an ultrasonic sensor arranged to detect the ground plane at a certain angle and an ultrasonic sensor so as to sense the objects facing the individual parallel to the other ground plane.

Another invention encountered in the literature is the "Sensor walking stick" class of IPC No. A45B 7/00 with application number TR 2011 05315.

This invention was made for a sensor walking stick designed for visually impaired people, a lens unit located on the lower end and a control unit to be placed on the upper part, and a cable system for connecting the energies to the battery and to detect the obstacles that will come to the front of the visual impairments and to wain them with sirens, to prevent falls, bumps and injuries, or to reduce the worst.

It is the same walking stick and is characterized by the connection of the sensor and control unit to the Wireless system.

Another invention in the literature is A61 H3/06 IPC class "Obstacle detection obstacle device" with TR 2007 application number 00299.

The present invention relates to obstacle detection devices that allow visually impaired persons to perceive obstacles to be walked in and to be spotted in dark surroundings, is a walking stick having at least one vibrating device for effecting the obstacle on the way to the disabled person, at least one sensor for simultaneously providing the auditory warning that triggers said vibrating device, and an energy control box for transmitting the electrical power to said sensor and the vibrating device.

Another invention encountered in the literature is the "Sensor walking stick" class of IPC A61 H 3/02 IPC with application number TR 2015 12821.

The present invention is directed to an smart walking stick designed for persons with visual impairments, capable of sensing the surroundings of persons with visual impairments by informing them of various distances and heights of obstacles, enabling them to move more comfortably, independently, and live a comfortable life.

When the above inventions are examined, there is no development of a more noticeable separation of the white walking stick than other products.

The problem of desensitization to the above-mentioned vibrations arises in the rope that the distances with the sensors, such as the vibration.

As a result, developments are being made in white walking stick, which necessitates new structures that will overcome the disadvantages mentioned above and bring solutions to existing systems.

SHORT DESCRIPTION OF THE INVENTION

The present invention relates to a motion-liberating smart walking stick which introduces the above-mentioned product.

The main purpose of the invention is to improve the movement of the visually impaired user by making improvements on the original white walking stick and to make life easier.

Another object of the invention is to limit the use of the obstacle recognition sensor so that the obstacle in front of the visually impaired user is not insensitive to incoming vibrations and increases confidence in the walking stick.

This is achieved by the recognition of the obstacle recognition sensor only by the user's chest and head interferences.

Visually impaired, which controls the under-chest obstacles already with a walking stick does not receive the continuous vibration associated with the places it already controls with this method.

Another object of the invention is to provide visually impaired users with position information by means of the right-left vibration motors they have on them and to guide the user in this way so that the user can easily go where he wants.

Another aim of the invention is aimed at enabling visually impaired users to control the phone through the product, so as to make it easier for the visually impaired user to be aware of the communication and notifications while moving in their daily life.

Another object of the invention is to cause the visually impaired individual to be perceived more easily by the cars in the night darkness through the led light which he has included on it.

Another object of the invention is, means, in the event of any damage to the folding part forming the body part of the product, that the smart module can be removed by rotating it in the counterclockwise direction by means of the old folding barrel fixture, and the new folding barrel is rotated clockwise through the nose opening.

Thanks to the screwdriver fixture on the end of the folding insert, when the folding wand part is damaged the visually impaired individual can simply change the folding section without having to open the smart module (handle).

To do this, it is sufficient for the user to twist the folding knob out of position and then insert the "new" folding knob by turning it through the nose opening and turning it clockwise.

Another object of the invention is to provide a technological tool for the visually impaired individual who can only need a single walking stick for the visually impaired individual and can be developed by applications that can be written by the user, including touch mouse, vibration motors, microphone, speaker, ultrasonic sensor, accelerometer, compass and bluetooth modules to be open.

In order to accomplish all the objects mentioned above and which will be apparent from the following detailed description, deals with a movement-liberating smart walking stick that allows the visually impaired user to go where he wants easily, safely and comfortably, to increase his freedom of movement, to guide him with his position information, to recognize and protect the obstacles that may arise during his movements, to eliminate technological needs and maintain a more ergonomic life.

In order to best understand the structure of the present invention and its advantages with additional elements, it is to be appreciated that the shapes described below are to be understood.

SHORT DESCRIPTION OF THE FIGURES

FIG. 1 It is a side view of the motion-liberating smart walking stick according to the invention.

Figure 2:
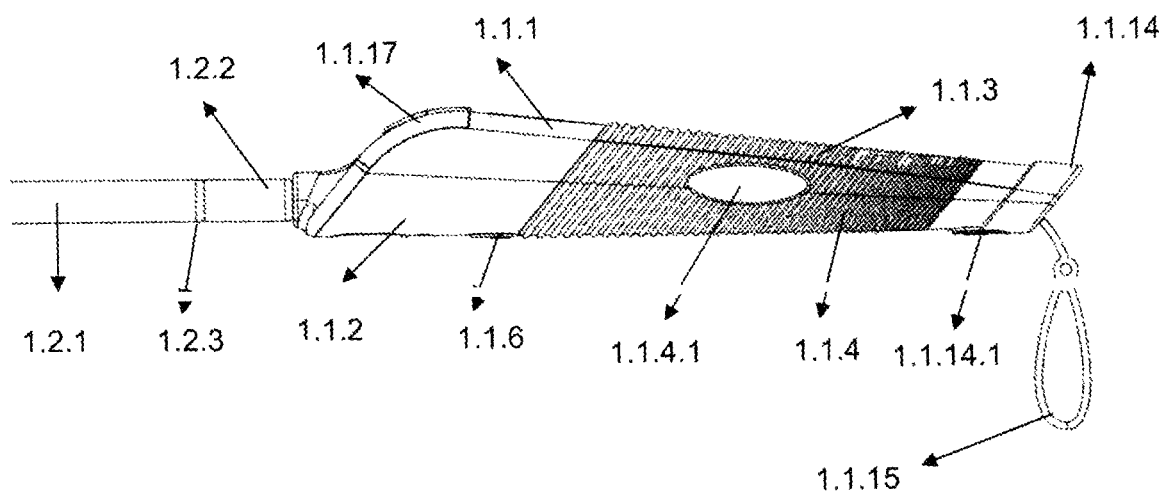

FIG. 2 It is a side plan view of the intelligent module section of the motion-liberating smart walking stick according to the invention.

Figure 3:
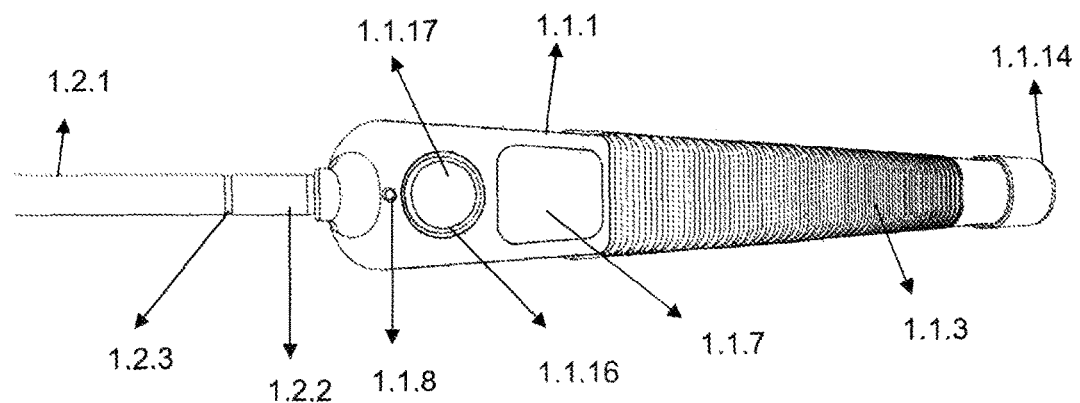

FIG. 3 It is the top plan view of the intelligent module section of the motion-liberating smart walking stick according to the invention.

Figure 4:
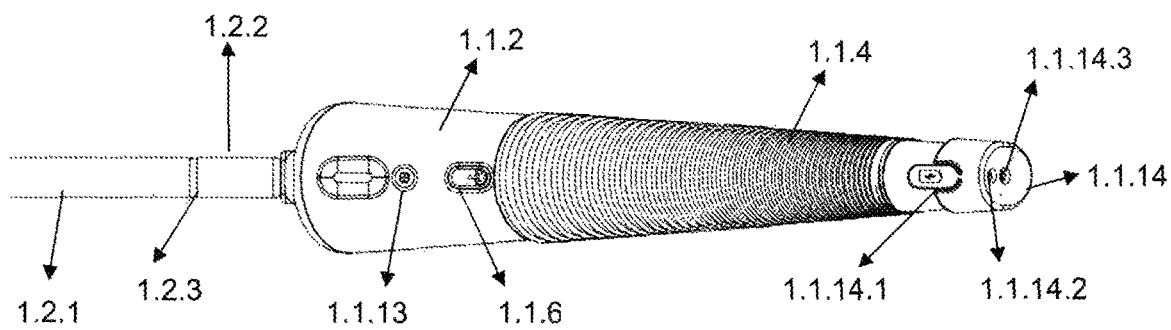

FIG. 4 It is the bottom plan view of the intelligent module section of the motion-liberating smart walking stick according to the invention.

Figure 5:
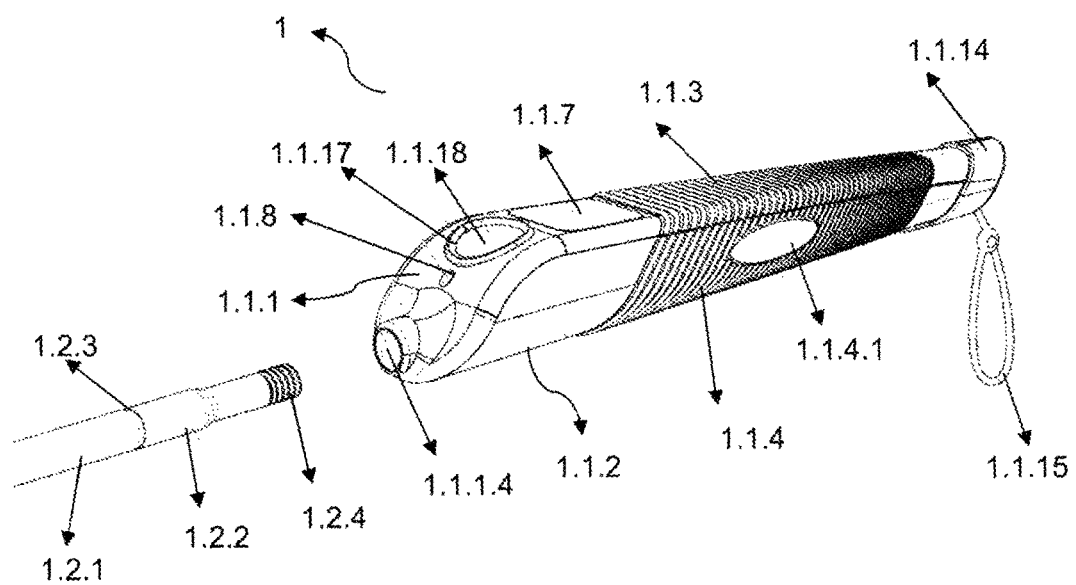

FIG. 5 It is a perspective view of the smart-module and folding wand sections of the motion-liberating intelligent walking stick according to the invention, prior to being mounted.

Figure 6:
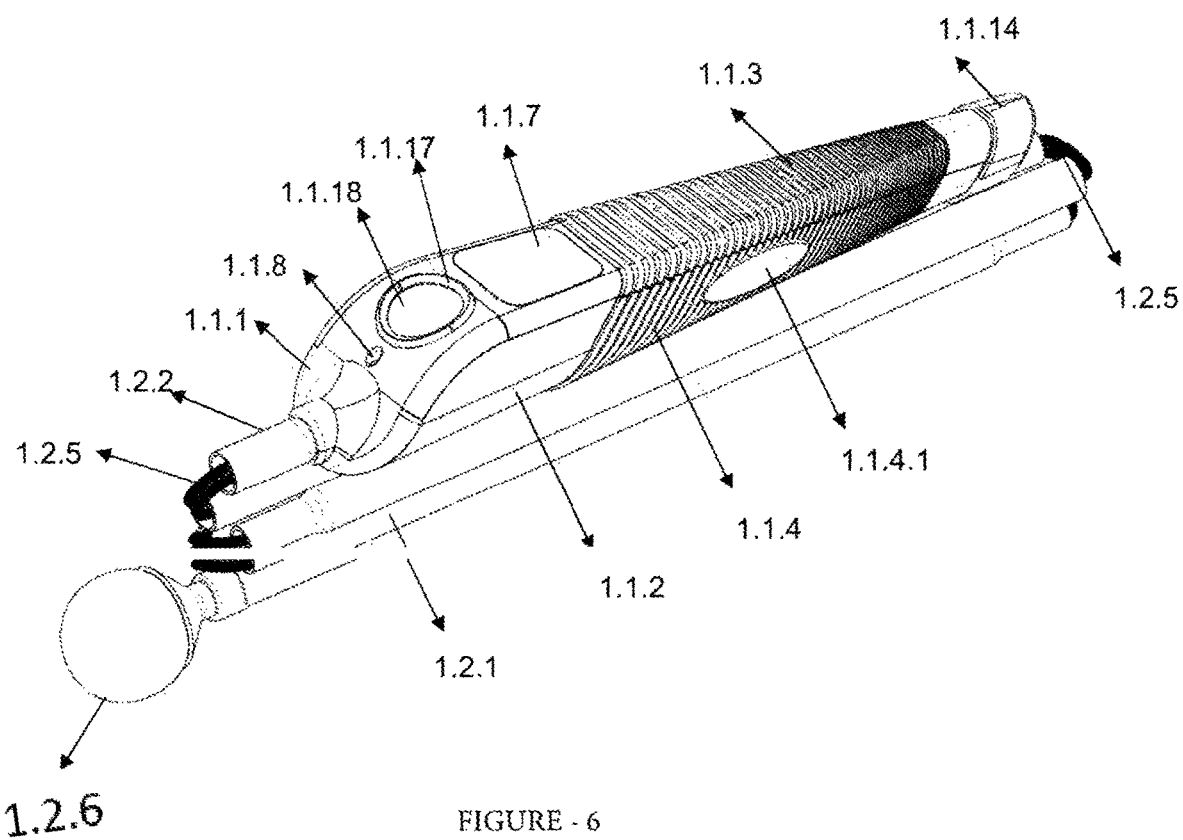

FIG. 6 It is the folded perspective view of the folding wand portion of the movement-liberating intelligent walking cane according to the invention.

Figure 7:
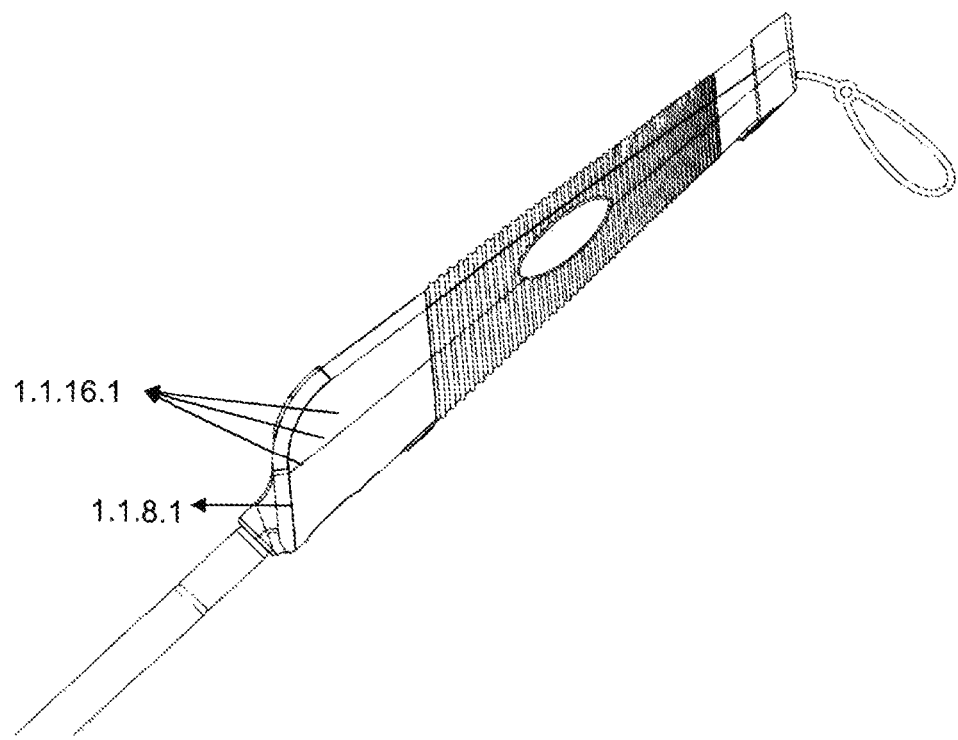

FIG. 7 It is a side plan view during use of the intelligent module section of the motion-liberating intelligent walking stick according to the invention.

Figure 8:
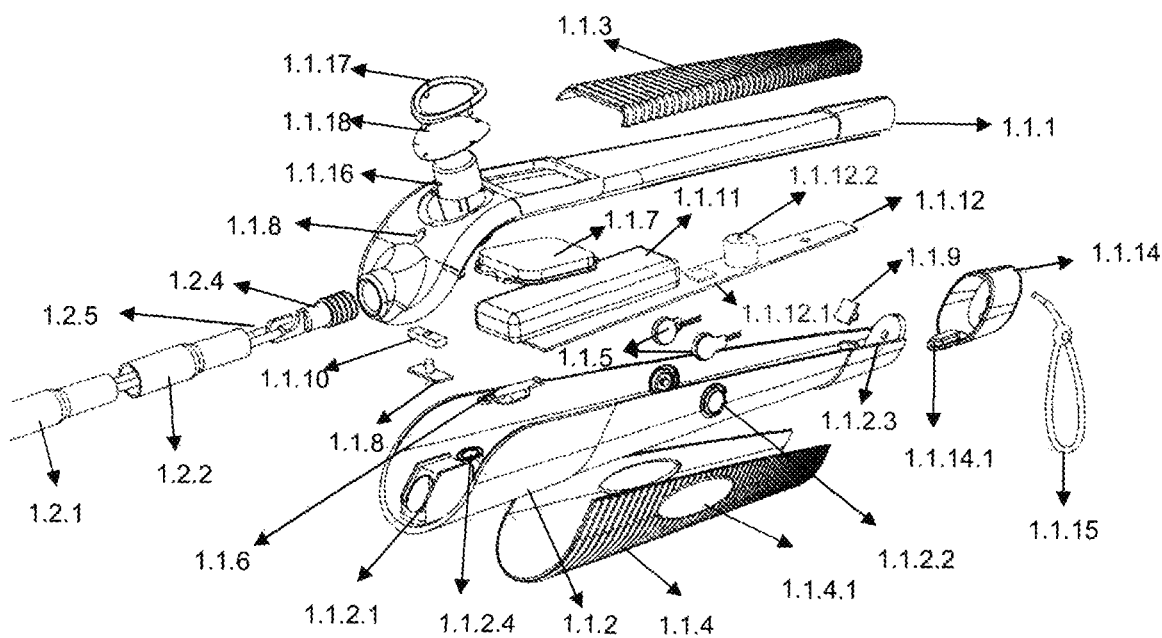

FIG. 8 It is the top perspective view of the intelligent module section of the motion-liberating intelligent walking stick according to the invention.

Figure 9:
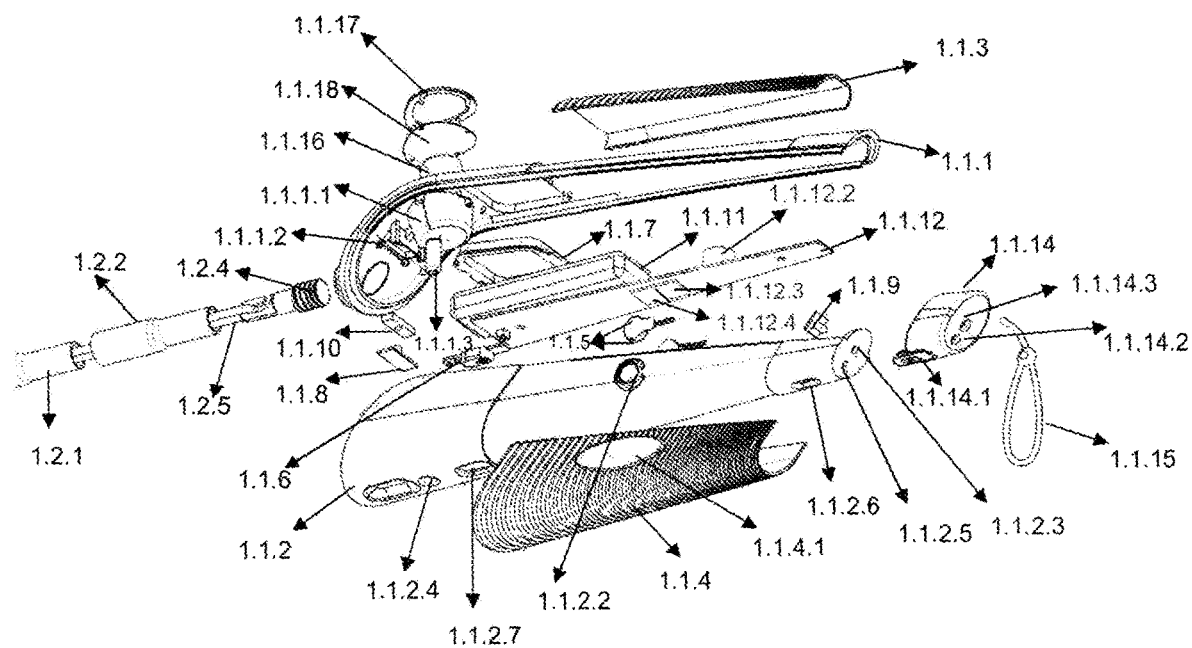

FIG. 9 It is a bottom perspective view of the intelligent module section of the motion-liberating intelligent walking stick according to the invention.

REFERENCE NUMBERS

1. Motion-liberating smart walking stick
1.1. Smart Module
1.1.1. Upper body
1.1.1.1. Sensor enclosure
1.1.1.2. Led bed
1.1.1.3. Upper body mounting screw housing
1.1.1.4. Nose opening
1.1.1.5. Led enclosure
1.1.2. Underbody
1.1.2.1. Cane fixture housing
1.1.2.2. Vibration Drums
1.1.2.3. Microphone housing
1.1.2.4. Bottom body mounting screw housing
1.1.2.5. Wrist strap housing
1.1.2.6. Power supply housing
1.1.2.7. Button housing
.3. Upper grip surface
.4. Bottom grip surface
1.1.4.1. Lateral vibration surface .5. Vibration motors
.6. Button
.7. Touch mouse
.8. Led
1..8.. Direction of LED radiation .9. Microphone
.10. Led gasket
.11. Power supply
.12. Circuit card
1.1.12.1. Communication module
1.1.12.2. Speaker
1.1.12.3. Compass
1.1.12.4. Accelerometer
.13. Mounting screw
.14. Spool cover
1.1.14.1. Power supply Cover
1.1.14.2. Spool wrist strap housing
1.1.14.3. Spool Microphone housing .15. Wrist strap
.16. sensor
1.1.16.1. Effective sensor
area
.17. Sensor framework .18. Sensor screen oldable cane
.1. Module of Cane
.2. The top-mini module of Cane, .3. Cane joint point
1.2.4. Cane Fixture
1.2.5. Elastic twine
1.2.6. Swivel nipple

DETAILED DESCRIPTION OF THE INVENTION

In the present invention, relates to a motion-relieving intelligent walking stick (1) which meets the above-mentioned requirements, removes all disadvantages and adds some additional advantages.

In this detailed explanation that the innovation of the invention is explained only by examples which do not have any limiting effect for better understanding of the subject. Accordingly, in the following description and drawings, the invention is associated that is made up of main parcels including the upper body (1.1.2) forming the upper body and the lower body elements forming the lower body; with the aim of positioning the hand correctly in the way of the visually impaired user, the with sensors (1.1.16), which contain technological elements such as soft-grip upper gripping surface and the lower gripping surface (1.1.3), touch mouse (1.1.4), vibration motors (1.1.5) an smart module (1) that allows the user 1.1 freedom of movement, comprising a folding bar (1) forming the stick portion of the movement-releasing smart walking stick (1.2) which can be replaced by a snap-fit method, with the motion-liberating smart walking stick (1) that allows the visually impaired user to easily, safely and comfortably at the desired times, which increases the freedom of movement, to navigate with location info, to detect and protect the obstacles to be plowed in front of the movement, and to maintain a more ergonomic life them by eliminating their technological requirements and structural elements that bring about this mechanism are explained.

The upper body (1.1.1) and lower body (1.1.2) shown in FIG. 5 are located in the smart module (1.1)

In addition, the intelligent module (1.1) has soft-handed upper grip surfaces (1.1.3) and lower grip surfaces (1.1.4) for the purpose of providing a soft hand to the user of the visually impaired and to provide a proper hand positioning.

In FIG. 8, the lateral vibration surface (1.1.4.1) on the lower gripping surface (1.1.4) in the intelligent mode (1.1) can be seen.

The lateral vibration surface (1.1.4.1) is smooth and the vibrations performed by the vibration motors on both sides of the intelligent module (1.1) transmit to the contacting hand of the user.

Vibrating motors (1.1.5) are vibrating with movement from the sensor (1.1.16).

Vibration motors (1.1.5) are mounted on vibration drums (1.1.2.2) located on both sides of the lower body (1.1.2).

Vibration drums (1.1.2.2) are connected on the lower body.

(1.1.2) This ensures that the generated vibrations are only transferred to the lateral vibration surface. (1.1.4.1)

In FIG. 3 and FIG. 6 the touch mouse positioned (1.1.7) on the upper gripping surface of the smart module, can be encountered.

Thanks to the finger movements of the visually impaired user has a communication module (1.1.12.1) that enables the control of mobile devices, via the touch mouse (1.1.7).

The communication module can be (1.1.12.1) bluetooth, wifi, RFID or NIR.

With the button (1.1.6) located on the lower gripping surface (1.1.4), the touching mouse (1.1.7) can be activated or deactivated.

The button (1.1.6) is located in the buttonhole (1.1.2.7) located on the lower body. In FIG. 8 and FIG. 9, the technological elements on the circuit board (1.1.12) can be observed.

On the top part of the circuit board (1.1.12) communication module (1.1.12.1) providing control on the mobile devices and next to the speaker (1.1.12.2) which provides sound for directing the visually impaired user are positioned; whereas on the bottom part of the circuit board (1.1.12), a compass (1.1.12.3) providing location and direction information to the visually impaired user and an accelerometer (1.1.12.4) providing the acceleration of the visually impaired user are positioned. In FIG. 8, a sensor (1.1.16) located in the sensor enclosure (1.1.1.1) which is protected around by a sensor screen (1.1.18) made of impermeable material, positioned on the top of the upper body (1.1.1) and sensor framework (1.1.17) is seen.

Sensor (1.1.16) is a device for sensing the presence of obstacles in the effective sensor area of the motion-free intelligent walking stick (1) in the visually impaired user's path and for generating vibrations.

The sensor (1.1.16) can also be used as an ultrasonic sensor.

In FIG. 9, the tail cap made of elastomer material covering the tail portion of the intelligent module (1.1) (1.1.14) can be seen.

The upper body and the lower body are fixed by the mounting screw on the lower body mounting screw housing, the mounting screw is held on the inner surfaces of the upper body mounting screw recess positioned on the lower portion of the sensor housing in the upper body via the lower body mounting screw recess.

The tail cap (1.1.14) is passed to the tail section and the upper body and the lower body (1.1.2) are provided to be fixed.

In FIG. 4, the microphone housing (1.1.2.3) and the wrist strap housing (1.1.2.5) located in the tail of the lower body (1.1.2) can be seen.

When the microphone (1.1.9) is mounted on the microphone socket, the Wrist strap
(1.1.15) is mounted on the Wrist strap (1.1.2.5) section.

The wrist strap (1.1.15) facilitates the retention of the motion-liberating wrist (1).

Tail Wrist strap housing on the tail cover and tail microphone holder is where the bracelet and microphone are inserted in the tailgate, and it is produced in a smaller diameter to ensure that these parts are leakproof.

FIG. 9 shows the LED (1.1.8) is connected to the ledge (1.1.1.2) on the bottom of the LED socket (1.1.1.5) located on the upper body (1.1.1) using the led gasket (1.1.10).

Thanks to the light that it spreads the LED (1.1.8) on the upper body (1.1.1) provides night vision.

The direction of the LED radiation, which is the radiation field emitted by the LED (1.1.8), is shown in FIG. 7.

In FIG. 9 there can be seen the power supply socket on the tail (1.1.11) part of the lower body, the power supply socket on which the power supply ropes (1.1.14) and the power supply socket (1.1.2.6) which covers the power supply socket (1.1.14.1) on the tailgate.

By producing the power source lid (1.1.14.1) in the elastomeric structure, sealing is also intended in this region.

In FIG. 9, the power supply (1.1.11) and the circuit board (1.1.12), which are the other electronic parasers in the intelligent module (1.1), can be seen.

The power supply (1.1.11) energizes the entire system, i.e. the intelligent module (1.1), and can be battery-powered.

The folding wand (1.2) shown in FIG. 8 forms one of the two main parts of the movement-releasing intelligent wand (1).

In case of any damage, it can be removed by turning it counterclockwise by means of the swivel fixture (1.2.4) in the up part and can be fitted in place by turning clockwise inwards from the nose opening (1.1.1.4) and so (1.2.4) allows the folding walking stick (1.2) to be changed when requested.

The stick fixture (1.2.4), is mounted on the rack fixture slot which is located on the lower body (1.1.2) passing through the nose opening (1.1.1.4) above the upper body, (1.1.1)

The folding wand (1.2) can be folded from the joint points (1.2.3)

The elastic string (1.2.5) k in the wand fixture (1.2.4) and wand module (1.2.1), which has been passed to the wand upper mini-module (1.2.2) terminates at the upper end of the fold, Elastic twine (1.2.5) serves as a link between them folding wand and intelligent module, unused folding times and said movement allowing the intelligent walking stick to stand together.

The swivel up (1.2.6) located at the lower end of the folding bar (.2) is produced with the aim of minimizing friction on the ground and enabling the visually impaired user to economically use the motion-liberating wrist (1) on the floor.

The invention claimed is:

1. A motion-liberating intelligent walking stick for a visually impaired user, comprising:
    an upper body forming an upper assembly of the motion-liberating walking stick;
    a lower body having soft-handed upper grip surfaces and lower grip surfaces configured to provide a soft hand to the visually impaired user and to provide a proper hand positioning;
    a touch mouse, which allows the visually impaired user to communicate with a phone using finger movements;
    a sensor configured to detect obstacles in an effective sensor area and to generate a vibration;
    vibration motors performing vibrations with movement of said sensor;
    a power supply configured to supply power to all components of the motion-liberating intelligent walking stick, the power supply configured to be replaced by a snap-fit method; and
    vibration drums configured to transmit only vibrations on inner surfaces of the lower body to a lateral vibration surface on the lower body.

2. The motion-liberating intelligent walking stick according to claim 1, wherein the lateral vibration surface transmits the vibration of the vibrating motors to a contacting hand of the user.

3. The motion-liberating intelligent walking stick according to claim 1, further comprising a communication module that allows the visually impaired user to control mobile devices via touch-sensitive mouse via finger movements.

4. The motion-liberating intelligent walking stick according to claim 1, further comprising a speaker.

5. The motion-liberating intelligent walking stick according to claim 1, further comprising a button in a button housing, located in the lower body.

6. The motion-liberating intelligent walking stick according to claim 1, further comprising a microphone housing in the lower body, in which a microphone is located.

7. The motion-liberating intelligent walking stick according to claim 1, further comprising a wristband which facilitates retention of said motion-liberating intelligent walking stick.

8. The motion-liberating intelligent walking stick according to claim 7, further comprising a tail bracelet socket on a tail cover, wherein the wristband is located on the tail cover.

9. The motion-liberating intelligent walking stick according to claim 1, further comprising:
    an LED socket located on the upper body; and
    an LED located in the LED socket.

10. The motion-liberating intelligent walking stick according to claim 9, further comprising an LED ledge located on a bottom of the LED socket positioned on the upper body.

11. The motion-liberating intelligent walking stick according to claim 10, further comprising an LED seal which provides a connection to the LED at the bottom of the LED socket.

12. The motion-liberating intelligent walking stick according to claim 1, further comprising a power supply housing on the lower body, wherein the power supply is located in the power supply housing.

13. The motion-liberating intelligent walking stick according to claim 12, further comprising a power supply cover made of elastomer material sealing the power supply housing.

14. The motion-liberating intelligent walking stick according to claim 1, further comprising:
    a circuit board; and
    a compass, disposed on an underside of the circuit board, configured to provide place and direction information.

15. The motion-liberating intelligent walking stick according to claim 1, further comprising:
    a circuit board; and
    an accelerometer, disposed at a bottom of the circuit board, configured to measure an acceleration of the movement of a visual barrier.

16. The motion-liberating intelligent walking stick according to claim 1, further comprising a button located on the lower gripping surface and which can be activated or deactivated by a touch pad.

17. The motion-liberating intelligent walking stick according to claim 1, further comprising a tail cap made of elastomer material to fix the upper body and the lower body.

18. The motion-liberating intelligent walking stick according to claim 1, further comprising a lid on the upper body.

19. The motion-liberating intelligent walking stick according to claim 1, further comprising:
    a lower body mounting screw housing; and
    a mounting screw providing to fix the upper body and lower body on the lower body mounting screw housing.

20. The motion-liberating intelligent walking stick according to claim 1, further comprising a spool microphone housing.

21. The motion-liberating intelligent walking stick according to claim 1, further comprising:
    a folding wand foldable at joints;
    a nose opening located on the lower body; and
    a stick fixture mounted on the nose opening.

22. The motion-liberating intelligent walking stick according to claim 21, wherein the stick fixture is configured to be fitted in place by turning clockwise inwards from the nose opening.

\* \* \* \* \*